United States Patent [19]
Jones

[11] 3,742,608
[45] July 3, 1973

[54] MANUALLY OPERABLE PLAQUE REMOVING DENTAL TOOL

[76] Inventor: Norman A. Jones, 4591 W. Streetsboro Road, Richfield, Ohio 44286

[22] Filed: Apr. 21, 1972

[21] Appl. No.: 246,193

[52] U.S. Cl. ................................................. 32/59
[51] Int. Cl. ............................................. A61c 3/06
[58] Field of Search .................... 279/42; 32/58, 59, 32/40, 26, 27

[56] References Cited
UNITED STATES PATENTS
71,361 11/1867 Bryant .................................... 32/23
1,837,938 12/1931 Young ..................................... 32/59

*Primary Examiner*—Robert Peshock
*Attorney*—John Harrow Leonard

[57] ABSTRACT

An elastomeric plaque removing cup is detachably supported by its base near one end of an elongated handle which can be gripped and manipulated by the hand of an operator to engage the rim of the cup with the teeth in selected positions at, and slightly below, the gum line. The cup is oscillated about an axis, which extends laterally of the handle, by means of a transmission mechanism driven by a push button on the same side of the handle as the cup. The push button is positioned endwise of the handle so that it can be engaged and operated to oscillate the cup through a small angle by natural flexures of the thumb to and fro generally endwise of, and parallel to, the palm of the hand while the handle is held in the hand. The chuck is constrained from continuous unidirectional rotary motion. The parts of the device can be disassembled readily for cleaning and each part is easily cleanable when the device is disassembled.

10 Claims, 11 Drawing Figures

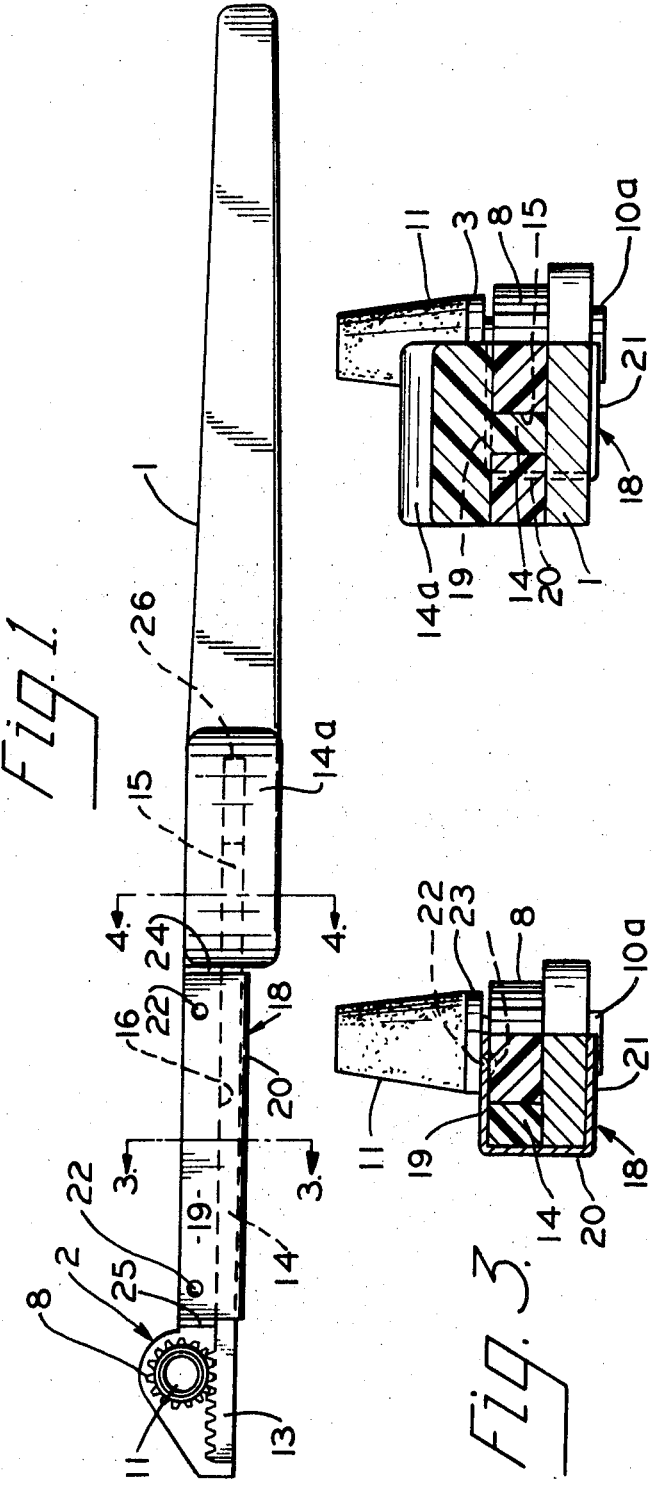
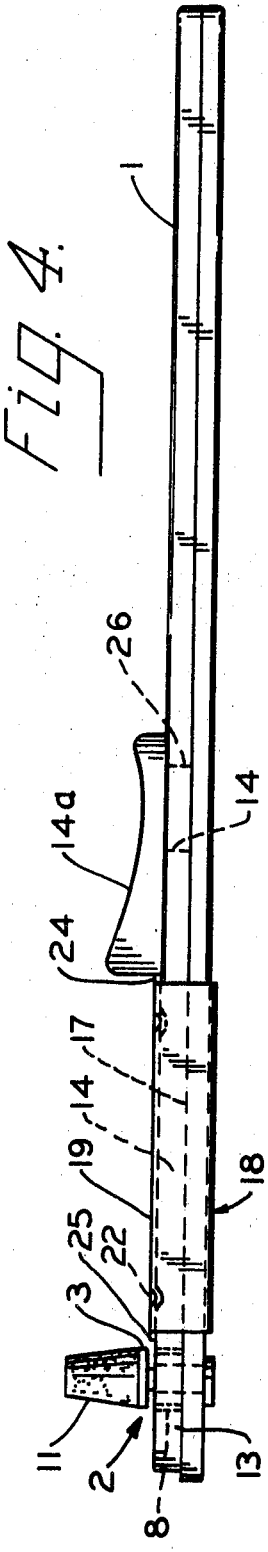

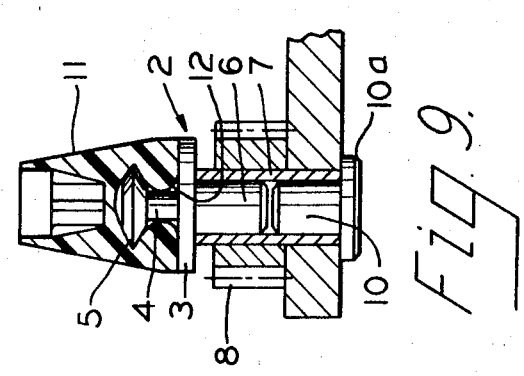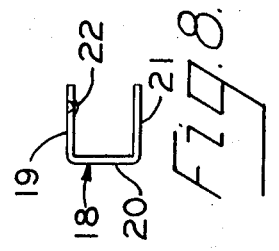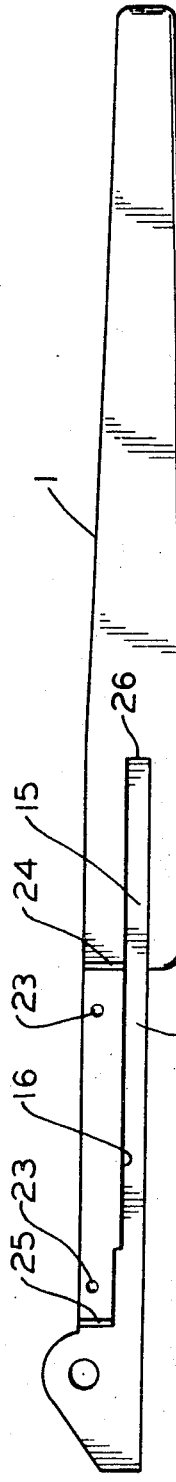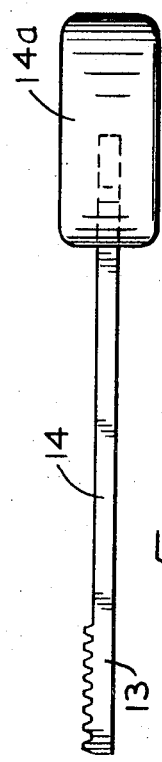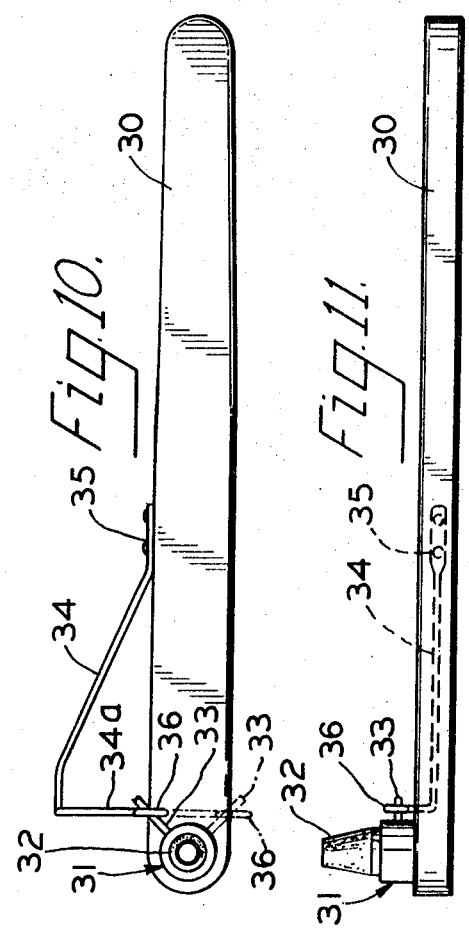

MANUALLY OPERABLE PLAQUE REMOVING DENTAL TOOL

BACKGROUND OF INVENTION

1. Field of Invention

Manually driven hand supported and manipulated dental tool.

2. Description of Prior Art

This invention relates to hand manipulated dental tools and particularly a dental hand tool for the removal of plaque which forms on teeth at and below the gum line.

In the field of dental hygiene, it has become established that accumulation of plaque on the exterior surfaces of the teeth adjacent to, and slightly below, the gum line is a forerunner and cause of tooth decay. The plaque is difficult to remove due to the fact that it forms initially at and below the gum line where the gum is exceptionally tender and the danger of serious abrasion thereof and injury thereto are very pronounced.

Plaque removal from this area cannot be effected satisfactorily by conventional toothbrushes, toothpicks, and like equipment heretofore available for non-professional dental hygiene use, as in the home. Attempts at such removal impose so great dangers of abrasion and damage to the gum that they are not recommended. Instead, the prior safe and practical manner of plaque removal was periodic cleaning of the teeth by a dentist employing a hygienic cup, such as disclosed in U.S. Pat. No. 2,017,881, driven by a rotary chuck commonly used to drive rotary dental burrs, drills, cutting discs, and the like.

As disclosed in the above patent, such are made of soft elastomeric material. In use such a cup is mounted at its base on a chuck for rotation in coaxial relation with the spindle thereof and with the open end facing outwardly endwise of the spindle. The cup is manipulated by pressing it generally endwise, open end foremost, against the teeth with sufficient pressure to distort or deflect the thin flexible rim at the open end of the cup and cause the rim to pass between the teeth and gum to a limited depth below the gum line into the area in which plaque initially forms. The cup is continuously rotated unidirectionally while being applied by the dentist. Skill is required even by the professional to apply the rotating cup lightly and successively, and to manipulate it properly, without damaging or serious abrading the gum. In no event should such a cup be applied with unidirectional rotary motion by the inexpert. Unidirectional rotary motion even for a very short time, due to friction of the cup with the gum, forces the engaged gum area continuously in one direction and thereby urges the surface strata of the gum with a continuing force beyond its capability of further elastic deformation and constains it from returning. Upon this degree of force application being reached, continued application of the rotating cup scuffs and abrades the gum at this very sensitive area, a condition usually evidenced by bleeding, and requiring prompt rinsing and application of an antiseptic.

Heretofore dental broaches and reamers have been provided which are supported and manipulated by the hand and which are rotatably driven by the hand while the handle is hand supported.

A very early device of this general character is disclosed in Schmidt U.S. Pat. No. 310,323, of Jan. 6, 1885, in which a tool is unidirectionally rotated by a ratchet driven, in turn, by a lever which is oscillatable laterally toward and away from the handle.

Gray, U.S. Pat. No. 797,106 of Aug. 15, 1905, discloses a drill or reamer driven by gears, one of which is rotatable by a shaft extending lengthwise of the handle and carrying a driving sleeve which is accessible through a lateral opening in the handle for gripping between the fingers and manipulation thereby to rotate the tool.

The patent to Skalstad, U.S. Pat. No. 873,100, issued Dec. 10, 1907, discloses a broach at one end of an elongated handle. The broach is driven by bevel gears which, in turn, are driven by a rotatable knob at the opposite end of the handle.

The structure of the Ebenrighter U.S. Pat. No. 1,198,628 of Sept. 19, 1916 includes a broach extending laterally from one end of a handle, on the other end of which is a head apparently intended to bear against the palm of the hand while the forefinger and thumb grip an intermediate portion of the handle and rotated it for rotating the tool.

These devices were used for drilling and broaching and required continuous unidirectional rotation to perform their intended functions. They are not adapted for plaque removal and would be hazardous to use for such a purpose.

SUMMARY OF THE INVENTION

The present invention is directed to a manually supported and operable plaque removing tool which not only is advantageous for use by a dentist, but is such that it can be used by inexperienced operators, such as the individual caring for his own teeth, to erase, remove, or break loose the plaque readily, without danger of injuring the gums. The tool can be held in the hand easily and manipulated to deflect and dispose the rim of an elastomeric cup between the teeth and gum near the gum line, and whereupon the cup can be oscillated readily by the thumb of the hand in which the tool is held. The oscillation is limited so as not to deform or stretch the gum beyond its elastic limit or to such a degree that abrasion of the gum by the cup results. The oscillation of the cup can be effected by natural flexure and reflexure of the thumb of the holding and manipulating hand so that no strain is imposed on the operator's hand during manipulation and oscillation. The tool is designed so that it can be disassembled readily, without the need for tools, as to meet hygienic standards for cleaning.

Various objects and advantages of the present invention will become apparent from the following description wherein reference is made to the drawings in which —

FIG. 1 is a top plan view of a device embodying the principal of the present invention;

FIG. 2 is a front elevation of the device illustrated in FIG. 1;

FIG. 3 is a vertical sectional view taken on the line 3—3 in FIG. 1;

FIG. 4 is a vertical sectional view taken on the line 4—4 in FIG. 1;

FIG. 5 is a top plan view of the handle of the device with the removable parts of the device omitted;

FIG. 6 is a top plan view of the drive and transmission mechanism, illustrated in FIG. 1;

FIG. 7 is a top plan view of an assembly retention clamp used on the structure illustrated in FIG. 1;

FIG. 8 is a right end elevation of the clamp illustrated in FIG. 7; and

FIG. 9 is an enlarged fragmentary front elevation of the device showing the chuck and its driving connection, with the hygienic plaque removing cup, partly in section, mounted on the chuck;

FIG. 10 is a top plan view of a modified form of the device; and FIG. 11 is a front elevation of the modified structure illustrated in FIG. 10.

Referring first to FIGS. 1 through 9, the present device comprises an elongated rigid handle 1 on the outer end of which a chuck 2 is mounted for rotation about an axis extending generally normal to the plane of the upper face of the handle 1 As best illustrated in the enlarged FIG. 9, the chuck 2 may comprise a disc-like body or platen 3 having an outwardly extending stud 4 which terminates in an enlarged head 5. At the opposite face of the platen 3 is a stud 6 which is press fitted into a sleeve 7. A spur gear 8 is fixedly mounted on, and is coaxial with, the sleeve 7 and stud 6. A holding pin 10 is also press fitted into the sleeve 7 and has an enlarged head 10a which engages the under side of the handle, as will later be described, for holding the platen 3, gear 8, sleeve 7, and pin 10 itself, in assembled relation with an axis extending substantially upright in FIG. 1. The particular chuck shown is one adapted to receive a conventional soft, elastomeric hygienic cleaning cup 11 such as disclosed in the above U.S. Pat. No. 2,071,881, and which are customarily used on conventional power driven rotary drilling tool chucks of dentists.

The cup, as illustrated, is open at the end outwardly from the platen 3 and at its inner end it is provided with a cavity 12 with a restricted opening through which the enlarged head 5 can be forced so as to be firmly gripped and held within the cavity 12, and thereby hold the cup in coaxial relation with, and for oscillation with, the chuck, with the inner end of the cup bearing against the platen 3.

The gear 8 comprises part of a rack and pinion transmission means by which manual power is transmitted to the chuck for oscillating the chuck. The transmission means further include a rack 13 in driving engagement with the pinion or gear 8, and an elongated arm 14 thereon. The rack 13 and its arm 14 are elongated and extend lengthwise endwise of the handle 1. The arm carries an integral button 14a.

For supporting the rack 13 and its arm 14 in operating position the handle 1, the rack and arm are slidably mounted in, and guided by endwise movement by the walls of an elongated slot 15 which opens through the upper face of the handle 1 in spaced relation to its lateral edges. The slot 15 extends only part way of the length of the handle toward the chuck end. Beyond the outer end of the slot 15 in the direction toward the chuck, the handle 1 has a side guide wall 16 which preferably is a continuation of the inner side wall of the slot 15 and a bottom guide wall 17 which is a continuation of the bottom wall of the slot 15. However, the handle is open at the front along the portion coextensive with the wall 16 so that, when the arm 14 of the rack 13 is removed from the handle, the walls 16 and 17, are readily accessible for cleaning.

In order to assist in holding the arm 14 and rack 13 in proper position and for sliding along the slot 15 and in guiding relation with the walls 16 and 17, a suitable resilient clamp 18 is provided. The clamp 18 has a top wall 19 which, in the assembled relation of the device, overlies the top of the arm 14 in guiding and sliding relation thereto, and a front wall 20 which is juxtaposed lightly against the front edge of the arm 14 when the parts are assembled. Various means may be provided for holding the clamp 18 with these walls in place. Preferably, however, the clamp is provided with a bottom wall 21 so that the clamp is C-shape in cross section. The walls 19 and 21 resiliently grip the upper and lower faces on the handle 1 when the clamp is installed. Suitable nibs 22 on the clamp are received in dimples 23 in the top wall of the handle for assuring that the clamp 18 remains in installed position, when in normal use and thereby holds the rack and its arm in proper relation to the handle.

The clamp is preferably made of such length that its inner end engages an abutment 24 on the handle 1 and its outer end engages an abutment 25 thereon with slight clearance. The abutment 24 and the clamp are chosen relative to the location of the push botton 14a, so that in an extended position of the rack 13, as illustrated in FIG. 1, the button 14a engages the inner end of the clamp 18 and stops the movement of the rack 13 in the extending direction. The slot 15, at its inner end, has an abutment wall 26 which limits the movement of the rack in the retracting direction. These relations are chosen so that movement of the rack 13 from its rearmost position to its forwardmost position, rotates the chuck in one direction through less than a full revolution, and preferably about 180°, and upon return of the rack 13 to its fully retracted position, the chuck is rotated in the reverse direction through a like angle.

In order that the tool can be meticulously and precisely applied, the push button 14a is exposed on the same face of the handle 1 as the chuck 2. The handle is of such length and the push button 14a so positioned that while the handle is grasped in, and manipulated by, the hand of the operator in normal fashion, the push button can be engaged by the thumb of the grasping hand and reciprocated thereby lengthwise of the handle by normal flexure of the thumb generally parallel to the plam of the hand. Thus the cup can be manipulated and oscillated without danger of overrunning in either direction, while the hand remains free and untensioned, or strained, but functioning in an accustomed and natural manner.

As a result of the limited rotation of the elastomeric cup 11, combined with its resiliency and a certain limited yieldability of the gums, the cup does not rotate far enough to overstress the engaged areas of the gums beyond their elastic deformation, or hold them stressed so that they become abraded by the cup, as they would were it unidirectionally driven for a substantial period. At the same time, the cup erases or breaks loose the plaque between the gum and the base portion of the tooth slightly below, as well as at and above, the gum line.

In operation, the device is held in the hand and the open end of the cup is pressed against the base of the teeth sufficiently low so as to distort the outer rim and cause a portion of it to pass between the gum and teeth slightly below the gum line, whereupon the cup is oscillated with its axis directed generally toward the side walls of the teeth, and thereby erases or breaks loose the plaque.

This can be done without danger of abrading the gum, inasmuch as the gum can give to a slight amount while the plaque is fixed in position, wherefore the gum area can move somewhat with the rim of the cup while the rim moves relative to the plaque. Furthermore, in pressing toward the teeth, greater frictional resistance occurs between the plaque on the teeth and the rim of the cup than between the gum and the exterior of the cup rim. This is due partly to the fact that the exterior of the rim is continuously exposed to saliva and is well lubricated thereby, whereas the squeegee effect of the migrating cup tends to wipe away lubrication which would otherwise be present inside the cup, and which is not necessarily replaced continuously or effectively.

As is common with tools used for dental work, they must be capable of being very thoroughly cleaned quickly and simply, such as be rinsing with hot water with soap or other detergent or antiseptic therein. It is for this reason that it is preferable that the clamp 18 be made fully removable so that all parts are accessible for cleaning. With the clamp 18 removed, the rack 13 with its arm 14, and push button 14a are readily removable from the handle and accessible over the entire surface. For like reasons, it is preferable that the slot 15 be terminated a substantial distance from the chuck so that it and the two walls 16 and 17, while affording with the wall 20 of the clamp, an effective guide for the rack 13 and arm 14, nonetheless are readily accessible for cleaning when the rack and its arm are removed.

Referring next to FIGS. 10 and 11, a modification of the invention is illustrated in which a handle 30 is provided at one end with a chuck 31 carrying a tool or cup 32, such as the cup 11 heretofore described. The chuck 31 is pivotally mounted for rotation about an axis normal to the upper face of the handle 30. However, instead of a transmission means such as the rack and pinion heretofore described, the transmission means comprises the radial finger 33 which is rigid with the chuck. The finger 33 is driven by a spring arm 34 which is fixedly connected at one of its ends, as indicated at 35, to the handle 30. At its other end, the arm 34 carries an inward extension or rod 34a, the inner end of which carries an eyelet 36. The eyelet receives the outer end of the finger 33 and loosely accommodates the finger for concurrent movement endwise of the axis of the eyelet and rocking movement transversely of the axis of the eyelet. The arm 34 extends outwardly a sufficient distance so that in its released position the finger 33 extends outwardly at an abrupt angle to the length of the handle at one edge of the handle. When the arm 34 is pressed inwardly against the bias of the spring effect to its fullest extent, the finger 33 is swung about the axis of the chuck to a degree such that it extends outwardly at the opposite side of the handle 30, thus giving a total oscillation by manipulation of the arm 34 of about 90°.

It is apparent from the foregoing description that the handle can be held in the hand and manipulated thereby to dispose the cup at the selected location on the teeth and, while it is held in the selected location, the handle can be manipulated by normal flexure of the thumb transversely of the handle or toward and away from the palm while the handle 30 is held in the hand, so as to oscillate the cup through an angle so limited that the cup cannot seriously abrade or injure the gums.

Further, it is apparent that the modified device can be thoroughly cleaned readily. The devices are simple in shape and construction so that they can be produced at reasonable cost. No return springs of the usual type, such as a helical compression spring, which can become contaminated easily and which are difficult to keep clean, are employed.

Having thus described my invention, I claim —

1. A dental tool comprising:

an elongated handle adapted to be held between the fingers and thumb of the hand of an operator with one face disposed against the fingers and with the opposite face exposed toward the thumb;

pivot means connected to the handle near one end of the handle and having its pivotal axis extending transversely of the length of the handle;

a chuck mounted on the pivot means for oscillation about said axis, and including means for detachably receiving a tool for oscillation therewith;

transmission means carried by the handle and drivingly connected to the chuck and operable for oscillating the chuck when the transmission means is driven in reverse directions, respectively; and a manually operable member carried by the handle at said opposite face, and drivingly connected to the transmission means, for limited movement relative to the handle in reverse directions, respectively, for operating the transmission means in its said reverse directions, selectively;

characterized in that:

said operating member has a thumb engageable surface disposed at, and facing outwardly from, said opposite face, and so positioned that it can be engaged readily by the thumb and driven thereby for driving the member in its said reverse directions by normal flexure of the thumb of the hand of an operator while the thumb bears against said surface and exerts a component of force transversely of the handle toward said one face; and while the handle is held in, and manipulated to different positions by, said hand; and said driving surface is shaped and positioned so that said transverse component falls between the lateral limits of said one face.

2. The structure according to claim 1 wherein the manually operable member is movable endwise of the handle and is so positioned it can be driven in each of its said reverse directions by normal flexure of the thumb of the hand of an operator generally parallel to the plane of the palm of the hand of the operator while the handle is held in, and manipulated to different positions by movement of said hand.

3. The structure according to claim 1 wherein constraining means are provided and are operative to limit each oscillation of the chuck to an angle of less than a complete revolution.

4. The structure according to claim 1 wherein the transmission means includes a pinion on and coaxial with the chuck, a rack engaged therewith, means supporting the rack on the handle for movement endwise in a lineal path extending endwise of the handle;

the member is connected fixedly to one end of the rack, a button is mounted on, and in fixed relation to, the member; and said thumb engageable surface is on the outer face of the button.

5. The structure according to claim 4 wherein the handle has a lineal guide slot extending endwise of the handle and open at one face of the handle;

the rack is detachably receivable laterally of its length in said open slot through said open side and is guided for endwise reciprocation by the walls of the slot; and a movable retainer is carried on the handle and in one position closes part of the open sides of the slot and constrains the rack and member from movement laterally of the handle out of the slot, and in another position, is out of closing position relative to said part of the open side of the slot so that the rack and member can be moved bodily laterally of the handle out of the slot.

6. The structure according to claim 5 wherein the member and rack as a unit can be removed from said slot through its open side when said part is open and the pinion is located so that when said unit is removed, the pinion is fully exposed for cleansing.

7. The structure according to claim 1 wherein the said manually operable member is an arm secured at one of its ends to the handle and extending alongside the handle in laterally spaced relation thereto and oscillatable about its connected end laterally toward and away from the handle, and spring biased to said spaced relation;

said arm is movable toward the handle against the resistance of the biasing force by flexure of the thumb of the operator while the handle is gripped in the operator's hand; and the transmission means includes a driving connection between said arm and the chuck.

8. The structure according to claim 7 wherein the driving connection comprises a finger on the chuck and extending in a direction generally radially thereof; an element connected to the arm for movement thereby to and fro transversely of the handle, and connected to the finger for swinging the finger about the axis of the chuck upon said transverse movement with the element.

9. The structure according to claim 1 wherein the axis of the chuck extends through faces of the handle, and said thumb engageable surface is disposed at one of said faces.

10. The structure according to claim 9 wherein the means for detachably receiving the tool is coaxial with the axis of rotation of the chuck and is positioned to support the tool at said opposite face.

* * * * *